Oct. 3, 1961 J. R. McCABE 3,002,426
SLIDE PROJECTOR AND VIEWER
Filed Feb. 16, 1959 3 Sheets-Sheet 2

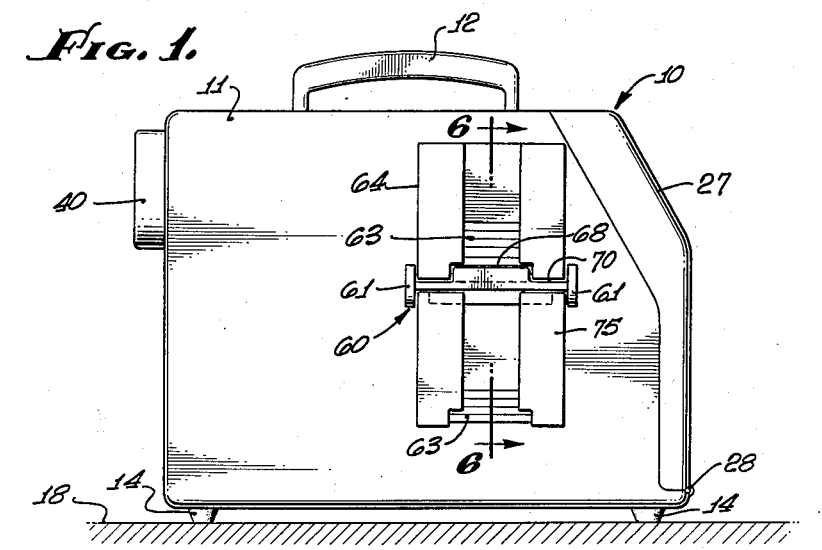
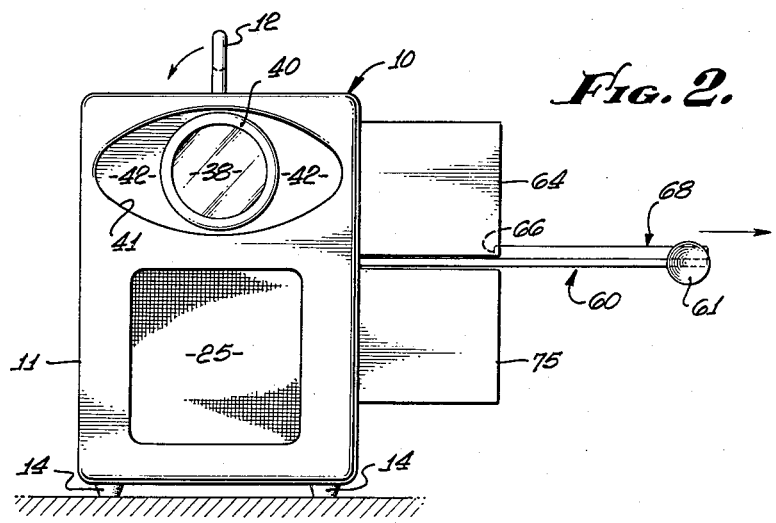
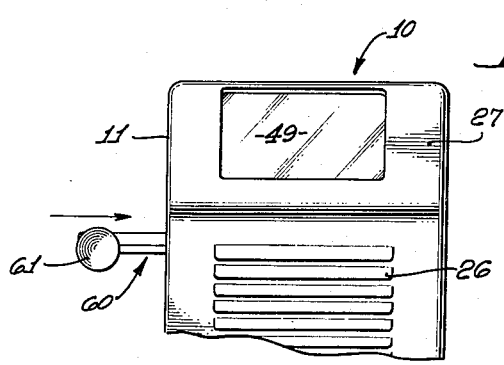

JOHN R. McCABE
INVENTOR.

BY
ATTORNEYS.

Oct. 3, 1961   J. R. McCABE   3,002,426
SLIDE PROJECTOR AND VIEWER
Filed Feb. 16, 1959   3 Sheets-Sheet 3

JOHN R. McCABE
INVENTOR.

BY White & Haefliger
ATTORNEYS.

United States Patent Office 3,002,426
Patented Oct. 3, 1961

3,002,426
SLIDE PROJECTOR AND VIEWER
John R. McCabe, 1825 Oak St., South Pasadena, Calif.
Filed Feb. 16, 1959, Ser. No. 793,387
3 Claims. (Cl. 88—26)

This invention relates generally to film slide projectors, and more particularly has to do with a novel projector embodying means in addition to the main light beam projecting means including auxiliary or secondary light beam projecting means whereby the projectionist may preliminarily view slide films prior to and independently of projection of such slide films upon a screen by the main light beam.

In the past, operators of slide projectors have been unable to determine in a rapid and easy manner the picture content of slide films in advance of inserting the slides in the projector to be pictured on the screen, projectionists normally resorting to the expedient of manually holding the film slides toward the light of a window or the screen itself for this purpose, this being an awkward and undesirable method of ascertaining the subject of the slide film. The present invention solves this problem in a novel manner by enabling the operator of the projector to preliminarily view the slide film while the latter is inserted into the projector itself. Light from a source in the projector and preferably of reduced intensity compared to the main beam projected toward the screen, is utilized and directed in a separate beam toward the slide manually inserted into the projector, and then directed toward the eye of the projectionist, who may then ascertain the picture content of the slide film independently of and preliminary to subsequent projection of the film on the screen. As a result, the operator will positively know the subject of the slides to be projected on the screen in advance of such projection, so that persons watching the screen in a darkened room will be assured of watching a a smoothly flowing, uninterrupted series of pictures projected in the correct order.

For the above purposes, the invention contemplates that the secondary light beam be projected rearwardly relative to the projector and toward the operator's eye with reduced intensity in relation to the main beam of light and preferably a battery powered low voltage lamp is used to supply the auxiliary beam, although a transformer may be provided to reduce the normal house voltage for application to that lamp, or a small portion of the light emitted by the main projector lamp may be directed in the secondary beam referred to. Also, a lens is used on conjunction with the secondary light beam for magnifying the image on the slide film, so that the operator may at a glance determine the picture content of the film.

Another major object of the invention includes the provision of an extremely compact projector enclosing the means referred to above for directed source light in first and second beams, the projector unit being so constructed that the lamp or lamps comprising the light source are always quickly accessible in the event of burn-out. Thus, the rear portion of the projector housing may be swung away to expose the light source and also the battery for the smaller lamp, to enable replacement thereof. Further, the compact projector has a forwardly elongated housing, and a motor driven fan longitudinally spaced from the main high intensity lamp in the lower portion of the housing for blowing cooling air longitudinally through the housing over the lamp. All the lenses are located above the level of the lamp referred to, with a mirror being provided for receiving incident light transmitted upwardly through a condensing lens, and for reflecting the incident beam forwardly toward a projecting lens. The smaller lamp is located at the side of the mirror opposite the path of forward light beam transmission, and in the upper rear portion of the housing as is the projecting lens associated with the smaller lamp, so that all of the space within the housing is put to most advantageous use.

Other important factors of the invention have to do with the arrangement and construction of a film slide carriage reciprocable in the housing to insert a film slide from a stack of slides to be shown, and to withdraw the inserted slide after showing thereof to discharge it into a second stack of already shown slides, all as will be more fully described.

These and other features and objects of the invention, as well as the details of an illustrative embodiment, will be more fully understood from the following detailed description of the drawings, in which:

FIG. 1 is a side elevation showing the exterior of a slide projector;

FIG. 2 is a front elevation of the projector;

FIG. 3 is a rear elevation of a fragmentary portion of the projector;

Figure 4:
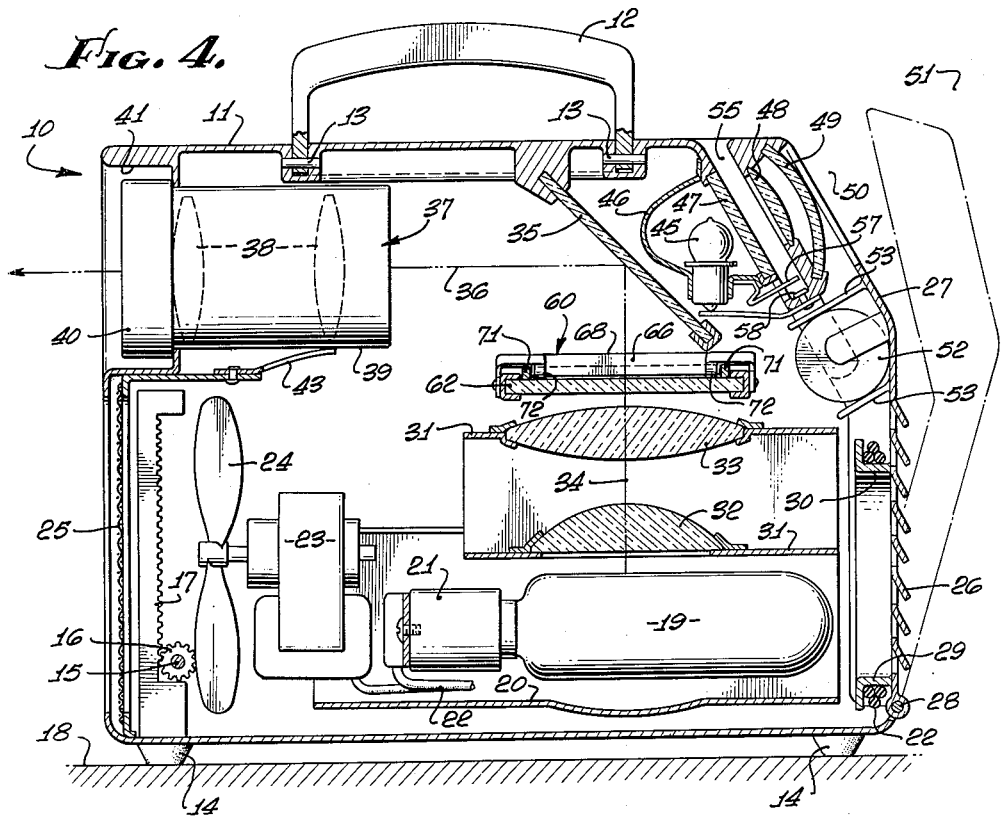
FIG. 4 is a side elevation taken in section through the projector.

Referring generally to FIGS. 1 through 3 of the drawings, the projector 10 includes a forwardly elongated and upright housing 11, which is generally rectangular as seen from the front and rear, the housing being relatively narrow in width. A handle 12 is pivotally connected to the top of the housing at 13 as better shown in FIG. 4, and four rubber shoes 14 support the bottom of the housing when the latter is in use for projection purposes. The forward end of the housing may be raised or lowered relative to a screen upon which film images are projected, by rotation of a shaft 15 supported by the housing, a cogwheel 16 on the shaft and meshing with a vertical rack 17 being turnable by the shaft to raise and lower the housing relative to the rack. The latter is carried by forward shoe 14, so that the rack and shoe remain stationary relative to a table 18 during lifting and lowering of the forward end of the housing 11.

An electric lamp 19 extends horizontally and rearwardly in a rearward portion of the housing above a reflector plate 20, the plug end of the lamp being detachably received in socket 21, and electrically connected with the cord 22, which also supplies electric current to motor 23 in the lower portion of the housing. When the motor and lamp are turned on by a suitable switch, not shown, a motor driven fan 24 draws air through the vent screen 25 recessed inwardly from the forward end of the housing and blows the air rearwardly through the housing in cooling relation with the high power lamp 19, the air being discharged through the louvers 26 formed in the rear section 27 of the housing.

Housing section 27 is freely pivoted at 28 near the bottom rear of the housing to be swung rearwardly at the will of the projectionist, thereby exposing the lamp 19 for convenient replacement. Also, rearward pivoting of the section 27 gives access to the extension cord 22 wrapped around a spool 29 during storage of the projector. Spool 29 forms a central opening 30 adjacent the louvers 26 so that cooling air may be discharged rearwardly through the louvers without obstruction to its flow.

Mounted above the lamp 19 by supports 31 is a condensing lens assembly, including a plano-convex lens 32 and a double convex lens 33 having a common vertical axis 34. Light from the lamp is gathered by this lens assembly and directed in a high intensity beam upwardly within the projector housing, to be reflected forwardly by a mirror 35 supported by the housing and extending in a flat plane making a 45 degree angle with the axis 34, as shown. The light beam reflected by the mirror is directed along the forward axis 36 of the projection lens assembly 37, which includes two thin compound lenses 38 acting to direct the high intensity beam forwardly of the projector toward a suitable screen not shown. Lenses 38 are mounted in a tubular housing 39, the forward enlarged end 40 of which extends in an oval recess 41 in the housing, as better shown in FIG. 2. The shape of the recess referred to provides finger space 42 at opposite sides of the lens housing forward end 40, so that the latter may be adjusted forwardly and rearwardly for focusing purposes, detent 43 shown in FIG. 4 bearing against the lens housing 39 acting to frictionally resist such adjustment. FIG. 1 shows the projection lens housing forward end 40 advanced to focusing position, whereas FIG. 4 shows it completely recessed, during storage and transportation of the projector.

Figure 5:
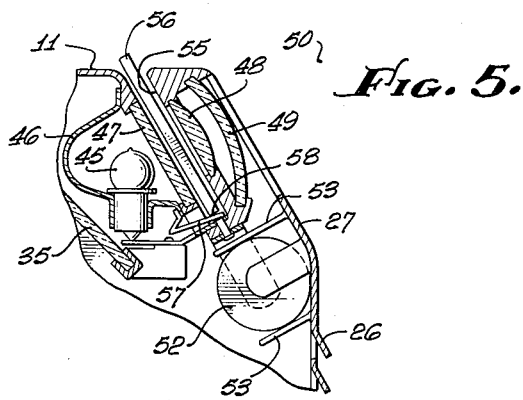
FIG. 5 is a fragmentary elevation taken in section through the rear portion of the projector also shown in FIG. 4.

Referring now to FIGS. 3 through 5, a second lamp 45 is shown mounted in the upper rear portion of the housing rearwardly of a reflector 46 and forwardly of a window 47 mounted by the housing 11. Lamp 45 has considerably reduced power as compared with lamp 19, and it is used for supplying light directed in a second beam by the magnifying lens assembly including the plano-convex lens and the meniscus lenses 49 mounted by the rear section 27 of the housing. The latter lenses have a common axis 50 intersecting the lamp 45 and extending rearwardly relative to the projector and upwardly toward the eye of the projectionist represented at 51.

Electric current for the lamp 45 is supplied by a suitable transformer or preferably a battery 52 also mounted by the rear housing section 20 between partitions 53, and it is readily seen that access to the battery may be had by rearward swinging of the section 27, for replacement purposes. Also, the upper portion of the rear housing section 27 mounting the battery and the lenses 48 and 49 in angled forwardly with respect to the pivot 28, so that the center of gravity of the rear section 27 with its mounted components is forward of a vertical through the pivot 28, thereby assuring that the rear section 27 will remain in closed position throughout the different positions of elevation assumed by the forward end of the projector.

Formed between the window 47 and the lens 48 and also by the housing 11 is an opening 55 into which a film slide 56 is downwardly insertible as shown in FIG. 5. As thus shown, the lamp 45, and lenses 48 and 49 are properly spaced so that light passes through the slide film as a secondary light beam, and the image on the film is magnified by the lens for viewing by the projectionist, who may rapidly preliminarily view slides as desired to ascertain their picture content. A spring finger 57 supports the bottom edge of the slide above the bottom 58 of the well or opening 55, and the projectionist may insert the slide further by finger pressure upon its upper edge, acting against the spring finger 57, to adjust the position of the projected film image with respect to his eye. The operator may look directly at the secondary light beam transmitted through the lenses 48 and 49 for viewing the slide film, since the power of lamp 45 is very low as compared with that of main projection lamp 19.

Figure 7:
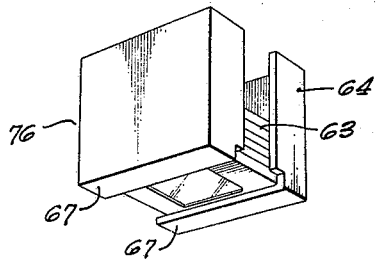
FIG. 7 is a perspective showing of the film slide magazine shown in FIG. 6.
Figure 8:
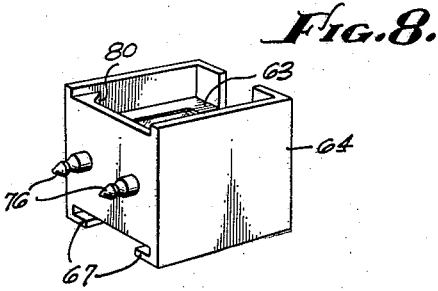
FIG. 8 is another perspective showing of the film slide magazine.

Turning to FIGS. 1 through 3 and 6, a carriage 60 is provided for inserting film slides into the housing 11 and into the path of the main high intensity light beam. The carriage has a pair of buttons 61 by which it may be grasped externally of the housing to reciprocate it transversely in a horizontal plane above the horizontal window 62 in the housing. Film slides 63 vertically stacked in face-to-face relation in a slide magazine 64 may be successively inserted into the housing through the opening 65 therein by inward movement of the carriage 60, shoulder 66 on the upper side of the carriage engaging the edge of a slide to carry it into the housing. During such inward insertion, the film slide rides upon laterally spaced shelves 67 shown in FIGS. 7 and 8 between which the carriage raised platform 68 is guided, shoulder 66 being at the forward end of the platform. The platform itself being raised prevents drop down of the next above slide in the magazine 64 into position for insertion into the projector housing.

During forward insertion of the carriage, a pair of detents 69 carried by the housing press down against the surface 70 of the carriage, holding the latter pressed downward against the guide rails 71, shown better in FIG. 4. Also, as the carriage approaches fully inserted position, a pair of detents 72 ride up and over the film slide 63 being inserted, pressing it downward, so that once the slide has cleared the magazine shelves 67, it is urged downwardly by the detents 72 through an opening 73 formed in the carriage, the shoulder 66 carrying the slide to fully inserted position with respect to the main light beam which then passes through the film to project images thereon toward the screen.

At the end of viewing of that slide, the carriage is withdrawn outwardly with respect to the projector housing 11, and the film slide which is now at the under side of carriage is retracted by engagement of a carriage shoulder 74 thereunder. Upon completion of carriage withdrawal, the retracted film slide is discharged by dropping downward into the lower magazine 75 attached to the housing beneath the carriage, as shown in FIG. 6.

Figure 6:
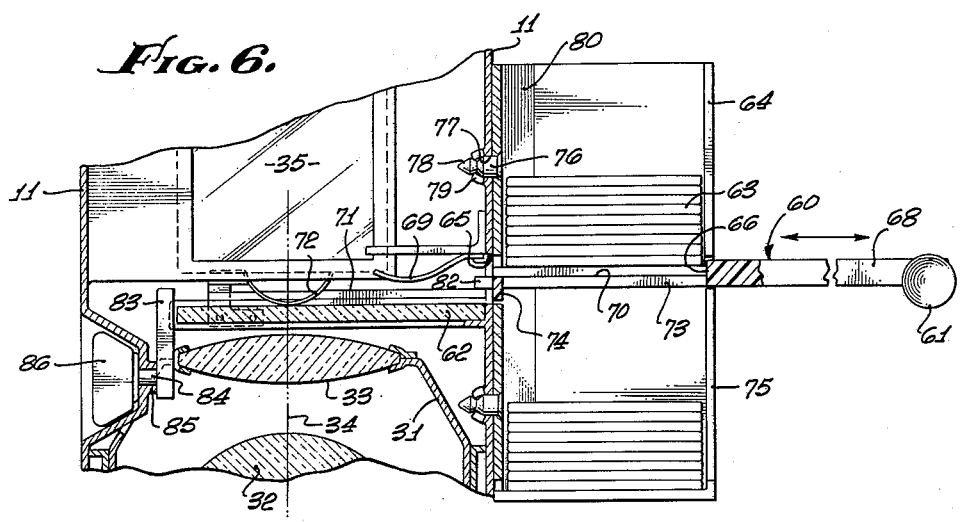
FIG. 6 is an elevation taken in section transversely through a portion of the projector.

Both magazines 64 and 75 are releasably or detachably connected with the housing 11 as shown in FIG. 6, as by the jack 76 connected with the magazines and insertible through openings 77 in the housing wall so that the heads 78 of the jacks snap between the spring arms 79 of the housing wall when the magazines are flush against the housing. In addition, the magazines have the same construction, and include angled interior corners 80 which match and preferably locate the notched sides of the slides for orientating the latter in the magazines so that the pictures on the slides will be properly orientated on the screen when projected.

Figure 10:
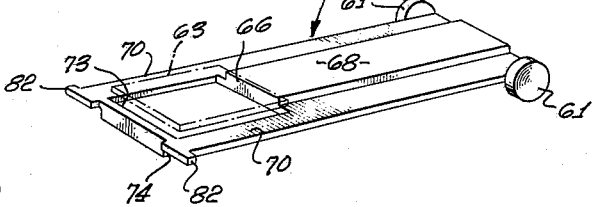
FIG. 10 is a perspective showing of a film slide carriage shown in FIG. 6.
Figure 9:
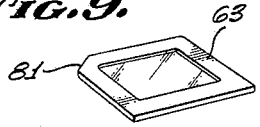
FIG. 9 is a perspective view of a representative film slide.

Reference to FIG. 10 will show that the innermost end of the carriage has laterally extending ears 82 which are engageable with the projector housing 11 upon carriage retraction to prevent complete withdrawal of the carriage. In the path of carriage insertion into the housing is a stop 83 shown in FIG. 6, which limits carriage insertion when the film slide has been brought into correct position for protection of the film picture content on the screen. At this time the carriage buttons 61 are spaced from the projector housing 11 by at least the width of the magazines 64, and it is desirable that the carriage buttons be movable closer to the housing when the magazines are removed therefrom, as during transportation or storage thereof. For this purpose, a stop 83 is mounted on a shaft 84 turnable in the socket 85 by a knob 86, which is itself recessed into the housing, as shown in FIG. 6. When the knob is rotated, the stop 83 is swung out of carriage travel limiting position, so that the carriage and particularly the buttons 61 may be pushed closer to the housing, as shown in FIG 3.

I claim:

1. An improved film slide projector, comprising an upright housing having lengthwise spaced front and rear walls, opposite side walls and opposite top and bottom walls, the housing having a generally rectangular cross-section in a plane extending lengthwise and widthwise of the housing and intersecting at least four of said walls including said front and rear walls, the housing interior including two widthwise spaced forward corner portions and two widthwise spaced rearward corner portions, the housing thickness between the remaining two walls being less than the housing width dimension, a primary light source in one rearward corner portion of the housing interior, a light reflector in the other rearward corner portion of the housing interior and arranged to receive incidence of light from said source and to reflect the light in a beam directed forwardly in the housing, a film slide pusher receivable in the rearward interior of the housing between said light source and reflector for pushing film slides into and out of the path of light passing from the source to the reflector, a forwardly and rearwardly movable projection lens in one forward corner portion of the housing interior forwardly of said reflector for projecting said beam forwardly, said housing forward wall containing an opening through which said beam may be projected, and a fan in the other forward corner portion of the housing interior and operable to displace air through the interior of the housing and over the light source in a cooling stream, said housing walls containing air inlet and outlet ports between which the air stream flows in a path having forward and rearward extent, said four walls including the top and bottom walls of the housing, said reflector being above said light source and said film slide pusher being movable in a horizontal plane below said reflector and above said light source, one of the housing walls containing a first opening through which said pusher is reciprocable horizontally, interchangeable upper and lower receptacles for stacking film slides directly above and below the pusher and exterior of and adjacent to said one side wall, the upper receptacle for supplying film slides downwardly one at a time to the pusher for insertion into the housing and the lower receptacle for receiving film slides from the pusher upon withdrawal thereof from the housing, said receptacles having upwardly facing shoulders for supporting film slides during horizontal pusher movement acting to push the lowermost slide from the upper receptacle and into the housing through said first opening, and means independently and removably attaching each of said receptacles to the housing.

2. The invention as defined in claim 1 in which said pusher has a first vertical shoulder engageable with the edge of said lowermost film slide in the upper receptacle to push said slide into the housing, said first vertical shoulder projecting above the level of said upwardly facing shoulders on the upper receptacle, said pusher contains an aperture sized to pass the inserted film slide vertically downwardly therethrough after the film slide is pushed off said upwardly facing shoulders on the upper receptacle, and said pusher has another vertical shoulder engageable with the opposite edge of said inserted film slide after the slide has dropped through said aperture for pushing the slide out of the housing and into position to drop into the lower receptacle during pusher movement outwardly from the housing.

3. An improved film slide projector, comprising an upright housing having lengthwise spaced front and rear walls, opposite side walls and opposite top and bottom walls, the housing having a generally rectangular cross-section in a plane extending lengthwise and widthwise of the housing and intersecting at least four of said walls including said front and rear walls, the housing interior including two widthwise spaced forward corner portions and two widthwise spaced rearward corner portions, the housing thickness between the remaining two walls being less than the housing width dimension, a primary light source in one rearward corner portion of the housing interior, a light reflector in the other rearward corner portion of the housing interior and arranged to receive incidence of light from said source and to reflect the light in a beam directed forwardly in the housing, a film slide pusher receivable in the rearward interior of the housing between said light source and reflector for pushing film slides into and out of the path of light passing from the source to the reflector, a forwardly and rearwardly movable projection lens in one forward corner portion of the housing interior forwardly of said reflector for projecting said beam forwardly, said housing forward wall containing an opening through which said beam may be projected, and a fan in the other forward corner portion of the housing interior and operable to displace air through the interior of the housing and over the light source in a cooling stream, said housing walls containing air inlet and outlet ports between which the air stream flows in a path having forward and rearward extent, said four walls including the top and bottom walls of the housing, said reflector being above said light source and said film slide pusher being movable in a horizontal plane below said reflector and above said light source, means hinging the rearward wall of said housing to swing rearwardly thereof exposing the interior of the housing for access, an electrical cord connectible in series with said primary light source, and means carried by said housing rearward wall at the inner side thereof for supporting said cord concealed within the rearwardmost interior of the housing.

References Cited in the file of this patent

UNITED STATES PATENTS

| | | |
|---|---|---|
| 2,445,929 | Sturgess | July 27, 1948 |
| 2,513,102 | Parlini et al. | June 27, 1950 |
| 2,549,898 | Fish | Apr. 24, 1951 |
| 2,666,360 | Collins | Jan. 9, 1954 |
| 2,711,118 | Briskin et al. | June 21, 1955 |
| 2,720,045 | Miller | Oct. 11, 1955 |
| 2,744,444 | Breitman | May 8, 1956 |
| 2,754,722 | Howell et al. | July 17, 1956 |